L. A. LANE.
HOOK.
APPLICATION FILED DEC. 13, 1910.
1,002,852.
Patented Sept. 12, 1911.
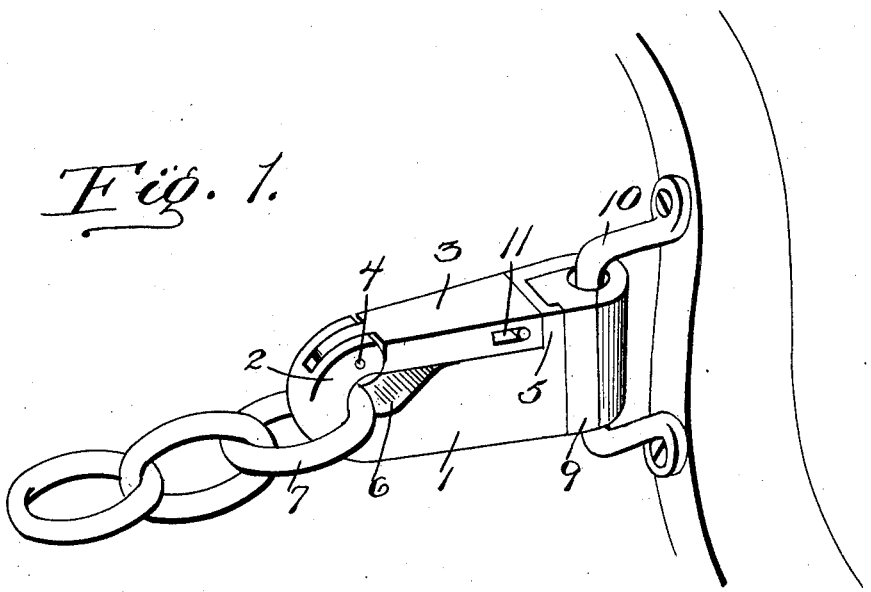
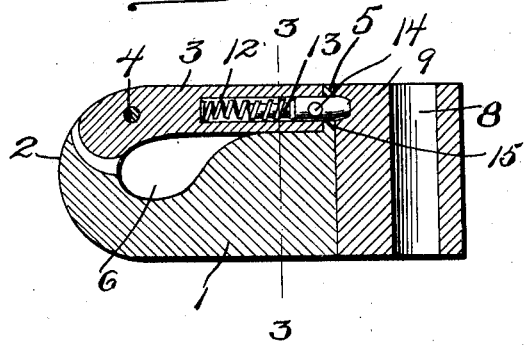
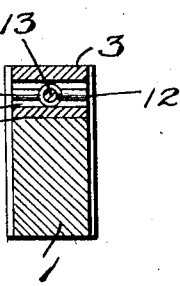
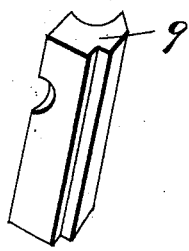
Witnesses
E. F. Thomas
S. W. Cook
Inventor
Lawrence A. Lane.
By Wm. C. R. W. Intire
Attorney

UNITED STATES PATENT OFFICE.

LAWRENCE A. LANE, OF PRINCETON, CALIFORNIA.

HOOK.

1,002,852. Specification of Letters Patent. Patented Sept. 12, 1911.

Application filed December 13, 1910. Serial No. 597,105.

*To all whom it may concern:*

Be it known that I, LAWRENCE A. LANE, a citizen of the United States, residing at Princeton, in the county of Colusa and State of California, have invented certain new and useful Improvements in Hooks; and I do hereby declare the following to be a full, clear, and exact description of the invention, such as will enable others skilled in the art to which it appertains to make and use the same.

This invention relates to improvements in hooks, and particularly to the type used on harnesses for fastening together the hame and chain tug; also for brake straps, belly bands and many other uses.

The simplicity and strength of the device is evident from its construction, and the absence of projecting parts adds to its durability.

With the above and other objects in view, this invention resides in the novel features of construction, formations, combinations and arrangements of parts to be hereinafter more fully described, claimed and illustrated in the accompanying drawings, in which, Figure 1 is a perspective view showing the device in operation; Fig. 2 is a longitudinal section through center of device; Fig. 3 is a section in the line 3—3 of Fig. 2, and Fig. 4 is a perspective view of key-shaped closing member.

Referring to the drawing by characters of reference, the numeral 1 represents the body of the hook, made of brass, galvanized iron, or some other suitable material. One extremity of the body 1 is formed in a crook 2, in the end of which is pivoted a closing member 3, by means of a pin 4, said member closing down on the shoulder 5, thus forming a loop 6, in which can be inserted the link of a chain 7, or any other piece to be retained. The other end of the body 1 is provided with a transverse groove 8, having its edges so formed that a key 9 may be slid in and completely close the opening, thus leaving a longitudinal hole formed by the groove 8 and the lower face of the key 9, in which may be retained the ring of the hame 10.

In the free end of the closing member 3 a hole is drilled and two opposite slots 11 are cut in the sides of said member to intersect said hole. A coil spring 12 is first inserted in the hole, followed by a plunger 13, provided with a shoulder to prevent the escape of said spring, the pin 14 then being passed through the slots 11 and a hole in the plunger or bolt 13, to retain same in place. A hole 15 is drilled through the shoulder 5 to register with the plunger 13 and a similar hole formed in the key 9, the plunger 13 being long enough to extend through the shoulder 5 and into the key 9, thus securely locking the entire device.

The pin 14 is made long enough so that it may be grasped by the fingers and slid up into the slots 11, thus withdrawing the plunger 13 from the hole in the shoulder 5 and key 9, and unlocking the device. The spring 12 is used to normally retain the plunger 13 in a locking position.

From the foregoing it can be seen that the device may be attached or detached without the aid of any tools whatever.

Having thus fully described my invention, what I claim as new and desire to secure by Letters Patent is:

1. A hook such as described, having two openings for the retention of objects to be linked together, two closing members and a spring retained bolt in the extremity of one of the closing members, and adapted to lock the two closing members in place.

2. A hook such as described, having two openings for the retention of objects to be linked together, a sliding member adapted to close one opening, and a pivoted member adapted to close the other, the pivoted member containing a spring retained bolt adapted to lock both members in position to close the opening.

In testimony whereof I affix my signature in presence of two witnesses.

LAWRENCE A. LANE.

Witnesses:
WILL JESSUP,
MINNIE E. JESSUP.

Copies of this patent may be obtained for five cents each, by addressing the "Commissioner of Patents, Washington, D. C."